Aug. 28, 1962 C. W. MAGNAT, JR 3,051,300
LINOTYPE SAFETY DEVICE
Filed April 27, 1960 2 Sheets-Sheet 1

Charles W. Magnat, Jr.
INVENTOR.

BY *Clarence A. O'Brien*
*and Harvey B. Jacobson*
Attorneys

Aug. 28, 1962

C. W. MAGNAT, JR 3,051,300

LINOTYPE SAFETY DEVICE

Filed April 27, 1960

Charles W. Magnat, Jr.
INVENTOR.

United States Patent Office 3,051,300
Patented Aug. 28, 1962

3,051,300
LINOTYPE SAFETY DEVICE
Charles W. Magnat, Jr., 3 Dick St., Bergenfield, N.J.
Filed Apr. 27, 1960, Ser. No. 25,077
10 Claims. (Cl. 199—52)

This invention relates to a safety device for any conventional type of type-casting machine whereby the machine drive is disengaged in response to malfunctioning of the machine.

It is therefore a primary object of this invention, to provide a safety device for any conventional type of type-casting machine or linotype machine, which device may be readily installed, accurately adjustable for proper opeartion and requiring little physical alteration of the machine parts in order to add the elements of this safety device.

It is therefore a further object of this invention in accordance with the foregoing object, to provide a safety device for any conventional type of type-casting machine further enhancing the operation of the type-casting machine by reducing if not eliminating "backsquirts" that often occur during the casting.

Prior safety devices have been designed to detect malfunction by either sensing overtravel of the pot lever and/or undertravel of the melting pot due to resistance to its advancement by the pot lever. Accordingly, prior safety devices were either incomplete, too complicated or not sufficiently instantaneous in response to malfunction to prevent damage.

In accordance with this invention, the safety device is simply attachable to the pot lever of the usual type-casting machine rather than to any stationary mounting structure so as to sense relative movement between the pot lever and melting pot by more than a predetermined amount, which would occur as a result of some malfunctioning. The safety device then actuates through the usual stopping mechanism, a clutch throw-out lever against the bias of a clutch spring to disengage the drive to a cam by means of which the pot lever is actuated to advance the melting pot. Also, because the safety device is engaged by the melting pot only at the limit of its proper advancement, the clutch spring bias will only then be available to supplement the force of the pot lever compression spring engaging the pot so as to prevent "backsquirts."

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
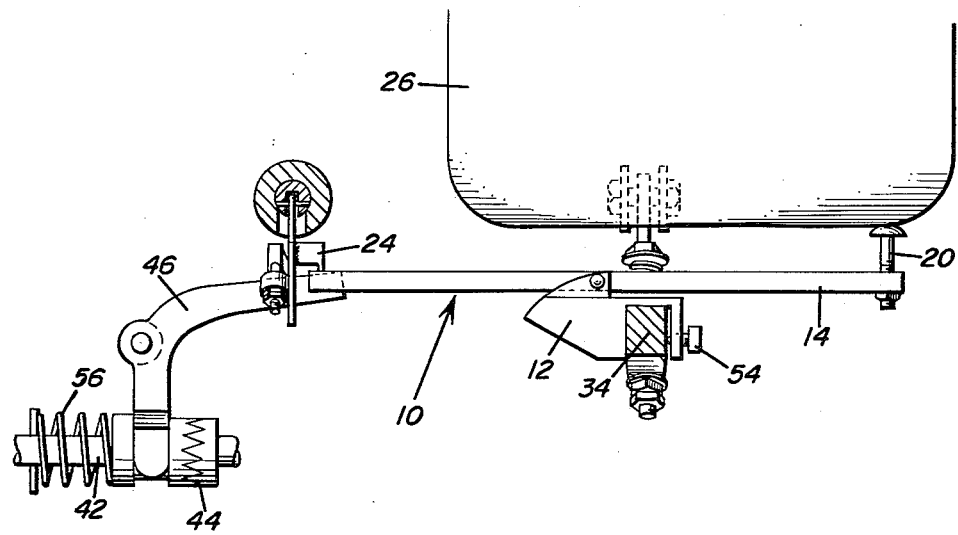
FIGURE 1 is a view with parts shown in section of the safety device in accordance with this invention.
Figure 2:
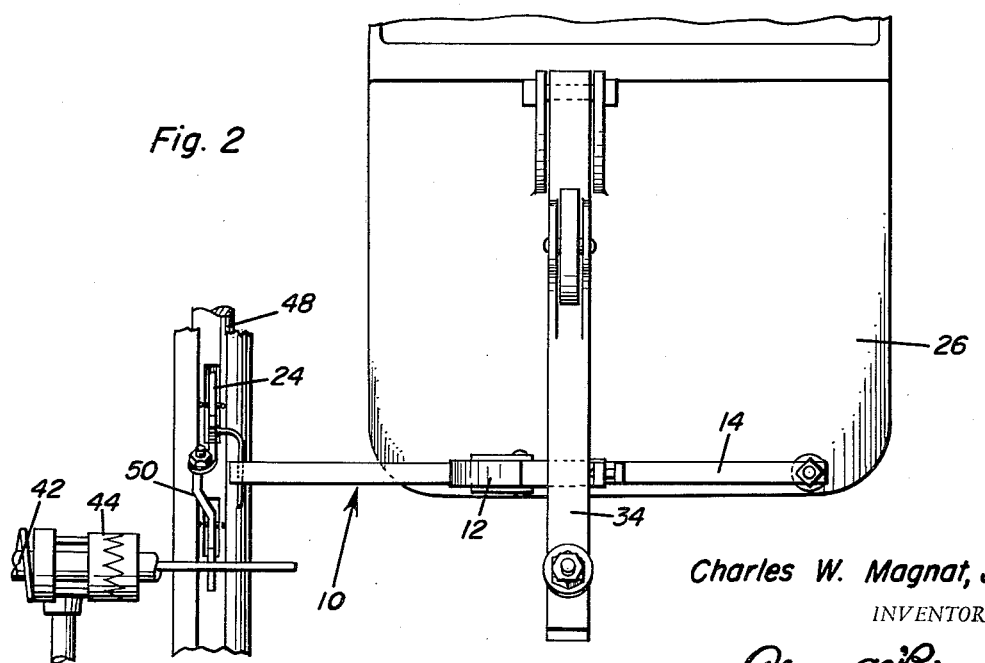
FIGURE 2 is a different view of the parts as shown in FIGURE 1.
Figures 3, 4, 5:
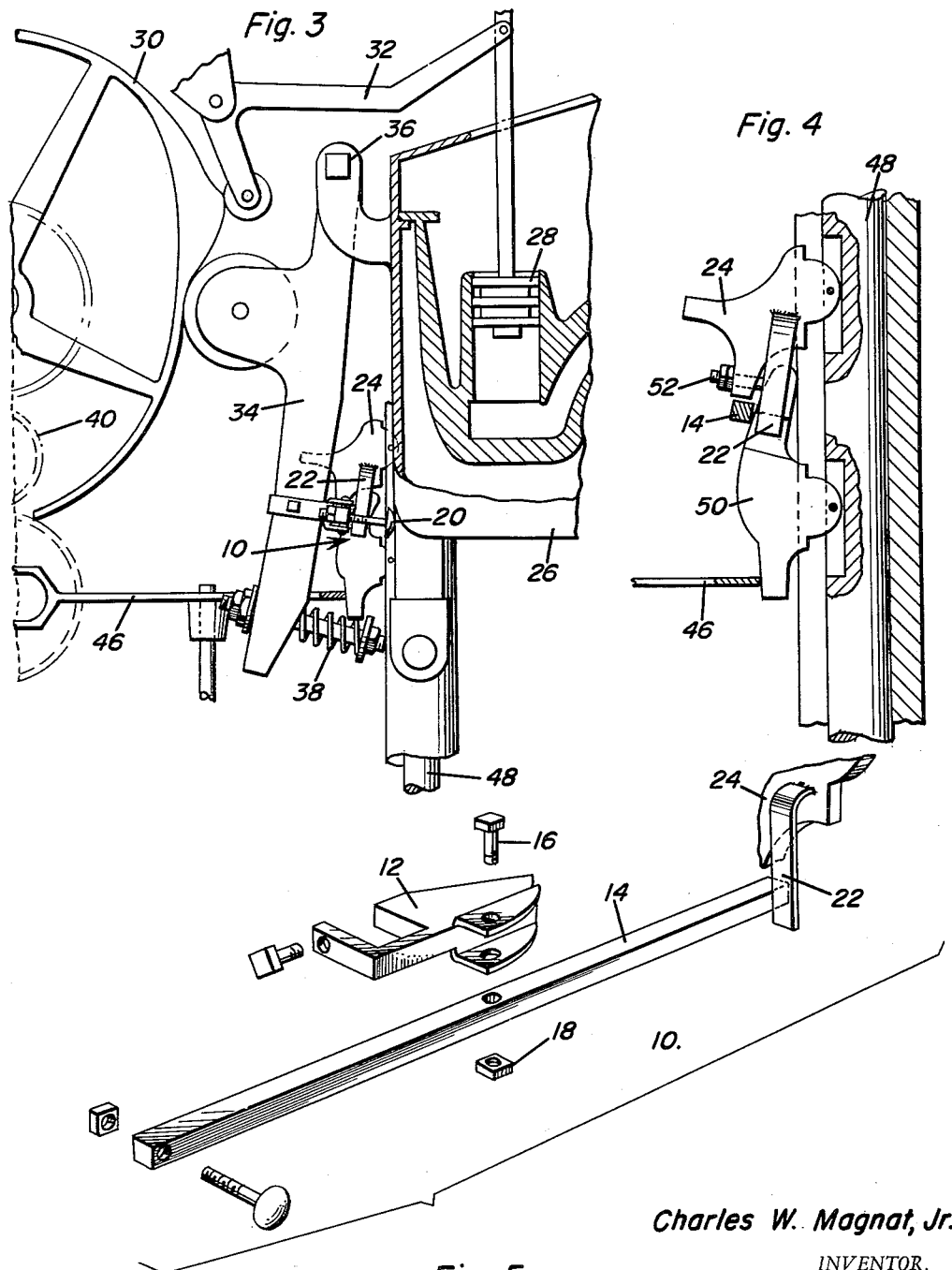
FIGURE 3 is a side view with parts shown in section of the melting pot, pot lever, stopping mechanism, disengageable drive mechanism and cam mechanism in operative relation to each other and including the safety device in accordance with this invention.
FIGURE 4 is a partial sectional view of the stopping mechanism as modified in accordance with this invention.
FIGURE 5 is a perspective view of the disassembled parts forming the safety device in accordance with this invention.

Referring to FIGURES 1, 2 and 5, the safety device is generally indicated by reference numeral 10 and includes a mounting member 12 pivoted to a pivotally displaceable bar 14 via screw 16 and nut 18 as shown in FIGURE 5, one end of said bar 14 having a spacing screw member 20 adjustably secured thereto. The other end of bar 14 is in contact with an extension 22 rigidly secured to an upper stopping lever 24 for purposes as will be hereafter explained. The device 10 thus constitutes a displacement sensing mechanism for detecting malfunction due to any combined overtravel of the pot lever and undertravel of the melting pot reflected by excessive relative movement between the pot and pot lever against the bias of compression spring 38 interposed therebetween.

Attention is now directed to FIGURE 3, wherein the operative relationship between various components of a conventional typesetting machine is illustrated. Reference numeral 26 indicates a melting pot which is pivoted to the machine frame and advanced into engagement with a mold for injection thereinto of molten metal by means of pump piston 28. The advancement of the pot and actuation of the pump piston 28 are controlled in timed relation to each other by a cam mechanism 30 which actuates a follower 32 connected to the pump piston 28 and also actuates a pot lever 34 pivoted to the melting pot at one end 36 and yieldably spaced from the pot at its other end by the compression spring mechanism 38. The cam 30 may be driven by gearing 40 from a drive shaft 42, as seen in FIGURES 1 and 2 which is disengageable from its power source by means of any suitable clutch mechanism 44 operated by a clutch throw-out lever 46 more clearly shown in FIGURES 1 and 3.

As more clearly shown in FIGURE 4, the clutch throw-out lever 46 may be actuated by a stopping mechanism mounted on the machine frame as by member 48 fixed to the machine frame, said stopping mechanism including a lower stopping lever 50 which is engageable with the clutch throw-out lever 46 at one end and engageable at its upper end with an adjustable screw 52 secured to an upper stopping lever 24 as hereinbefore mentioned. Pivotal movement of upper stopping lever 52 in a counter-clockwise direction will accordingly engage lower stopping lever 50 causing it to rotate in a clockwise direction to thereby engage and actuate clutch throw-out lever 46 against the bias of clutch spring 56 causing disengagement of clutch 44 and interruption of the drive to the cam mechanism 30. The upper stopping lever 24 therefore has fixed thereto the extension 22 which may be engaged by the bar 14 of the safety device in order to actuate the clutch throw-out lever 46 and disengage the drive from the cam mechanism 30.

Referring once again to FIGURE 3, the safety device is shown installed between the pot lever 34 and the melting pot 26. As more clearly seen in FIGURE 1, the bar 14 is mounted on the pot lever 34 by means of member 12 removably secured to the lever 34 by means of setscrew 54. Also, the bar 14 is spaced from the pot 26 by means of the screw member 20.

From the foregoing description, operation of the safety device is therefore apparent. When the advancement of the melting pot 26 toward a position in alignment with a type mold, is interrupted by some malfunction of the machine, continued rotation of the cam mechanism 30 will cause the pot lever 34 to pivot about pivot point 36 and compress spring mechanism 38 by an amount in excess of that for which it is designed, whereupon the lever 34 will cause safety bar 14 to pivot about its spacing member 20 in contact with the melting pot so that the other end of the bar 14 will contact and actuate the extension 22 on the upper stopping lever 24, as a result of which the clutch throw-out lever is actuated to disengage the drive to the cam mechanism as hereinbefore explained.

It will therefore be appreciated, that the safety device of this invention may be removably attached to the pot lever of any type-casting machine by use of the member 12 and setscrew 54, the safety bar 14 then capable of being accurately positioned in spaced relation between the pot lever and melting pot by adjustment of the spacing member 20 about which the bar 14 will pivot at the precise instant maulfunctioning occurs as reflected by relative movement between the pot lever and the melting pot more than it is designed to so move. The safety bar 14 then utilizing the existing stopping mechanism of a conventional typesetting machine by contacting an extension simply secured to the upper stopping lever of the stopping mechanism.

Another important feature of this invention, is that through this safety device, by adjusting the spacing member 20 the clutch spring 56 holding the clutch 44 engaged may be tensioned through bar 14, levers 24 and 50 and clutch throw-out lever 46, when the member 20 engages the melting pot 26 as the pot lever 34 compresses spring 38 within and up to its designed displacement, which occurs at the time that the pot is advanced to its designed displacement or at the time that the pot is advanced to its final position and at which time the type mold is cast. At such critical time therefore, the melting pot is being held in its casing position by both the spring mechanism 38 and the added force of clutch engaging spring 56 shown positioned on drive shaft 42 but capable of being located elsewhere to bias the clutch into engagement and to also act through spacing member 20 of the safety device to provide the additional spring force on the melting pot to prevent or reduce molten metal "backsquirts," by then only supplementing the force of spring 38 the pot in the casting position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a type-casting machine having a melting pot, a pot lever thereon, cam mechanism for yieldably advancing said pot through its lever, disengageable cam driving mechanism, stopping mechanism for the cam driving mechanism, and an improved safety device for disengaging said cam driving mechanism when advancement of the pot is interrupted by malfunctioning of the machine, said safety device comprising; lever means movable in response to relative movement between said pot and pot lever in excess of a predetermined amount, and means connected to said stopping mechanism and engageable by said lever means to thereby disengage said cam driving mechanism in response to movement of said lever means.

2. The safety device as defined in claim 1, wherein said lever means is operatively mounted on the pot lever in adjustably spaced relation between said pot and pot lever, and pivotally movable about adjustable spacing means connected to the lever means and in engagement with the pot for spacing said lever means relative to said pot.

3. The safety device as defined in claim 1, wherein said lever means is engageable with an extension fixed to a stopping lever of said stopping mechanism, said stopping lever being operatively connected to said disengageable cam driving mechanism.

4. In a type-casting machine having a melting pot, a pot lever thereon, cam mechanism for yieldably advancing said pot through its lever, disengageable cam driving mechanism, stopping mechanism for the cam driving mechanism, and an improved safety device for disengaging said cam driving mechanism when advancement of the pot is interrupted by malfunctioning of the machine, said safety device comprising; lever means operatively mounted on the pot lever and movable in response to relative movement between said pot and pot lever in excess of a predetermined amount, and means connected to said stopping mechanism and engageable by said lever means to thereby disengage said cam driving mechanism, said lever means being disposed between said pot and pot lever, and pivotally movable about adjustable spacing means for spacing said lever means relative to said pot, said lever means being engageable with an extension fixed to a stopping lever of said stopping mechanism, said stopping lever being operatively connected to said disengageable cam driving mechanism.

5. A safety device for a type-casting machine comprising a member adjustably secured to a pot lever, a safety bar pivotally connected to said member and positioned between said pot lever and a melting pot with which the pot lever coacts, an adjustable screw member secured to one end of said safety bar and engageable with said pot for spacing said bar therefrom, the other end of said bar being engageable with an extension fixed to a stopping lever which is operatively connected to a spring-biased clutch throw-out mechanism for disengaging drive of a pot lever-actuating cam mechanism.

6. The safety device as defined in claim 1, wherein said cam driving mechanism is spring-biased into engagement and operatively connected to said stopping means, said lever means being operatively connected in spaced relation to the pot, so that its operative connection to the spring-biased driving mechanism imposes a bias on said pot when engaged by said lever means.

7. In a type-casting machine having a melting pot and a pot lever pivotally displaceable with respect to each other and driven by a power operated cam mechanism, a safety device for disabling the cam mechanism when advancement of the melting pot is interrupted by malfunction of the machine comprising, elongated bar means mounted on the pot lever for pivotal displacement with respect thereto, spacer means connected to one end of the bar means for engagement with the melting pot to pivotally displace the bar means on the pot lever in response to displacement of the pot lever with respect to the melting pot in excess of a predetermined amount, and means operatively connected to the other end of the bar means for disabling the cam mechanism in response to said pivotal displacement of the bar means on the pot lever.

8. The combination of claim 7, wherein said disabling means includes biasing means urging the cam mechanism into an operative condition and applying a bias to the melting pot through the bar means when the spacer means is in engagement therewith to exert an additional force on the melting pot to prevent and reduce backsquirting.

9. In a type-casting machine having a melting pot pivotally advanced by a cam operated pot lever through a compression spring interposed therebetween, the combination of a cam drive mechanism, means for continuously biasing said drive mechanism into operative condition for operation of said pot lever and relative displacement sensing means operatively connected to the pot lever and the drive mechanism for displacement by the melting pot against the bias of the biasing means to instantaneously render the drive mechanism inoperative only in response to excessive relative displacement between the melting pot and pot lever.

10. The combination of claim 9, wherein said sensing means comprises, mounting means fixedly mounted on the pot lever, displaceable means pivotally mounted on said mounting means, spacing means mounted on said displaceable means for engagement with said melting pot and lever means operatively connecting said displaceable means to the drive mechanism.

References Cited in the file of this patent
UNITED STATES PATENTS

| | | |
|---|---|---|
| 1,780,848 | Sperry | Nov. 4, 1930 |
| 2,057,420 | Dent | Oct. 13, 1936 |
| 2,195,140 | Watson | Mar. 26, 1940 |